(12) United States Patent
Nguyen

(10) Patent No.: US 11,840,168 B2
(45) Date of Patent: Dec. 12, 2023

(54) ROLLING TRUCK BED TRAY

(71) Applicant: Hung Nguyen, Spring, TX (US)

(72) Inventor: Hung Nguyen, Spring, TX (US)

(*) Notice: Subject to any disclaimer, the term of this patent is extended or adjusted under 35 U.S.C. 154(b) by 0 days.

(21) Appl. No.: 17/234,734

(22) Filed: Apr. 19, 2021

(65) Prior Publication Data

US 2023/0339383 A1 Oct. 26, 2023

(51) Int. Cl.
*B60P 1/64* (2006.01)
*B60P 1/52* (2006.01)
*B60P 1/00* (2006.01)

(52) U.S. Cl.
CPC .............. *B60P 1/6427* (2013.01); *B60P 1/52* (2013.01); *B60P 1/003* (2013.01)

(58) Field of Classification Search
CPC ................................. B60P 1/6427; B60P 1/52
See application file for complete search history.

(56) References Cited

U.S. PATENT DOCUMENTS

| | | | |
|---|---|---|---|
| 5,456,511 A * | 10/1995 | Webber | B60P 1/00 296/26.09 |
| 5,513,941 A | 5/1996 | Kulas | |
| 5,634,408 A | 6/1997 | Jarkowski | |
| 5,649,731 A * | 7/1997 | Tognetti | B60P 1/003 296/26.09 |
| 6,065,792 A | 5/2000 | Sciullo | |
| 6,308,873 B1 * | 10/2001 | Baldas | B60R 7/02 217/15 |
| 6,561,746 B1 * | 5/2003 | Broussard | B60P 3/07 414/500 |
| 6,698,634 B2 * | 3/2004 | Thomson | B60P 3/341 224/404 |
| 6,705,656 B2 | 3/2004 | Keller | |
| 6,860,493 B2 | 3/2005 | Orozco | |
| 10,744,925 B1 | 8/2020 | Horst | |
| 2017/0120963 A1 * | 5/2017 | Roach | B60R 9/065 |

FOREIGN PATENT DOCUMENTS

CA 2223306 6/1999

\* cited by examiner

*Primary Examiner* — Jonathan Snelting
(74) *Attorney, Agent, or Firm* — Baker Donelson

(57) ABSTRACT

An article of manufacture for providing a rolling truck bed tray with a folding end is disclosed. The article includes a main tray component with a width that fits within the bed of a pickup truck, a folding extension component coupled to the main tray component by one or more hinges, and a plurality of casters coupled to an underside of the main tray component and the underside of the folding extension component. The folding extension component has an open position in which the main tray component and folding extension component are oriented at a common height above the bed of the pickup truck and a closed position in which the folding extension component is oriented on top of the main tray component.

16 Claims, 7 Drawing Sheets

ROLLING TRUCK BED TRAY

TECHNICAL FIELD

This application relates in general to an article of manufacture for providing pickup truck accessories, and more specifically, to an article of manufacture for providing a rolling truck bed tray.

BACKGROUND

Individuals in large numbers own and use pickup trucks to move material and items of all sizes, shapes, and weights from one place to another. Loading these items into a bed of a pickup truck typically has these individual reaching over an extended tailgate that has been folded down to provide access to the internal space of the truck bed. Items are lifted up onto the tailgate and then positioned further within the truck bed. This multiple step process may include climbing up onto the truck bed or tailgate to move items farther into the bed. All of these steps are inefficient and require a significant amount of effort.

Many items placed on truck bed also tend to roll around during transport. This creates spillage, breakage, and generally an unsafe condition for cargo and vehicle while in motion.

Therefore, a need exists for an article of manufacture for providing a rolling truck bed tray with a folding end for extending over a tailgate. The present invention attempts to address the limitations and deficiencies in prior solutions according to the principles and example embodiments disclosed herein.

SUMMARY

In accordance with the present invention, the above and other problems are solved by providing an article of manufacture for a rolling truck bed tray with a folding end for extending over a tailgate according to the principles and example embodiments disclosed herein.

In one embodiment, the present invention is an article of manufacture for providing a rolling truck bed tray with a folding end for extending over a tailgate. The article includes a main tray component having a width that fits within a bed of a pickup truck, a folding extension component coupled to the main tray component by one or more hinges, and a plurality of casters coupled to an underside of the main tray component and the underside of the folding extension component. The folding extension component has an open position in which the main tray component and folding extension component are oriented at a common height above the bed of the pickup truck and a closed position in which the folding extension component is oriented on top of the main tray component.

In another aspect of the present disclosure, a combined length of the main tray component and the folding extension component in the open position is less than the length of the bed of the pickup truck with its tailgate in a closed orientation.

In another aspect of the present disclosure, multiple casters are coupled to the underside of the folding extension component.

In another aspect of the present disclosure, the main tray component comprises a rear rail 201 coupled to an upper side along a back edge and a pair of side rails coupled to the upper side along the side edges.

In another aspect of the present disclosure, the pair of side rails run an entire length of the main tray component.

In another aspect of the present disclosure, the folding extension component is narrower than the main tray component to fit between the pair of side rails when in its closed position.

In another aspect of the present disclosure, the main tray component and the folding extension component are made of aluminum.

In another aspect of the present disclosure, the main tray component and the folding extension component are made of steel.

In another aspect of the present disclosure, the main tray component and the folding extension component are made of wood.

In another aspect of the present disclosure, the main tray component and the folding extension component are made of plastic or other polymer.

In another aspect of the present disclosure, the rolling truck bed tray further comprises a retention system for securely holding the rolling truck bed tray in place.

In another aspect of the present disclosure, the retention system comprises a set of straps for securing the rolling truck bed tray in place.

In another aspect of the present disclosure, the retention system includes a retention rod, a compression latch coupled to the rolling truck bed tray, and a set of support block coupling the retention rod in a particular orientation.

In another aspect of the present disclosure, the set of support blocks include a retention support block, a slide support block coupled to the rolling truck bed tray, and a stop block.

In another aspect of the present disclosure, the retention rod includes a rod member having a tailgate end and a latch end, a handle at the tailgate end, a stop coupler about the tailgate end to engage the stop block, and a bent hook at the latch end for coupling with the compression latch.

In another aspect of the present disclosure, the compression latch includes a housing, a spring, and a latching rod, having a Y-shaped end, coupled to the spring.

In another aspect of the present disclosure, the bent hook of the retention rod engages the Y-shaped end of the latch rod to compress the spring generating a retaining force along the length of the retention rod to cause a support surface of the handle to secure the retention system in place.

In another aspect of the present disclosure, the tray will be able to lock to rear of truck for material storage during transport via retention straps.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
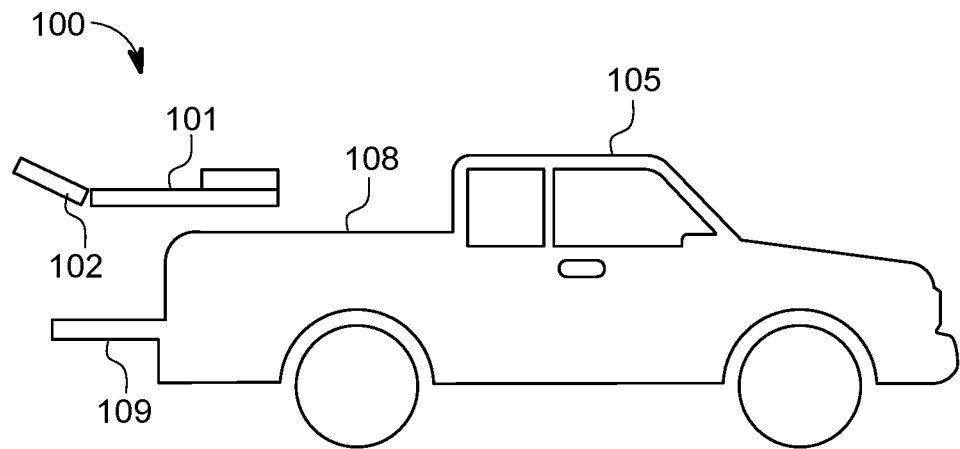
FIG. 1 illustrates an example embodiment of an article of manufacture for providing a rolling truck bed tray with a folding end for extending over a tailgate presented according to the present invention.

This application relates in general to an article of manufacture for providing pickup truck bed accessories end, and more specifically, to an article of manufacture for providing a rolling truck bed tray with a folding end according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "handyman," and "user" refer to an entity, e.g. a human, using an article of manufacture for providing a rolling truck bed tray with a folding end associated with the invention. The term user herein refers to one or more users.

The term "invention" or "present invention" refers to the invention being applied for via the patent application with the title "Rolling Truck Bed Tray." Invention may be used interchangeably with bed tray.

In general, the present disclosure relates to a system and method for providing pickup truck bed accessories. To better understand the present invention, FIG. 1 illustrates an example embodiment of an article of manufacture for providing a rolling truck bed tray with a folding end for extending over a tailgate according to the present invention. A pickup bed tray 100 is shown above a bed of a pickup truck 105 that has its tailgate 109 folded downward. The pickup bed tray 100 is made of a main tray component 101 and a folding extension component 102 that is coupled to an outer edge of the main tray component 101.

When in use, the pickup bed tray 100 may be positioned toward the tailgate 106 of the pickup truck 105 and the folding extension component 102 folded open to extend to the outer edge of the tailgate 106. Items to be stowed into the pickup truck bed may be placed onto the pickup bed tray 100 and once in position, the entire pickup bed tray 100 may be rolled back into the pickup truck bed to permit the tailgate 106 to be closed.

When the pickup bed tray 100 is not in use, the folding extension component 102 may be folded on top of the main tray component 101 to reduce its overall space within the truck bed so that a portion of the truck bed is free for use. The bed tray is also designed to be fully removed and stored when the entire truck bed is needed for other purposes.

Figure 2:
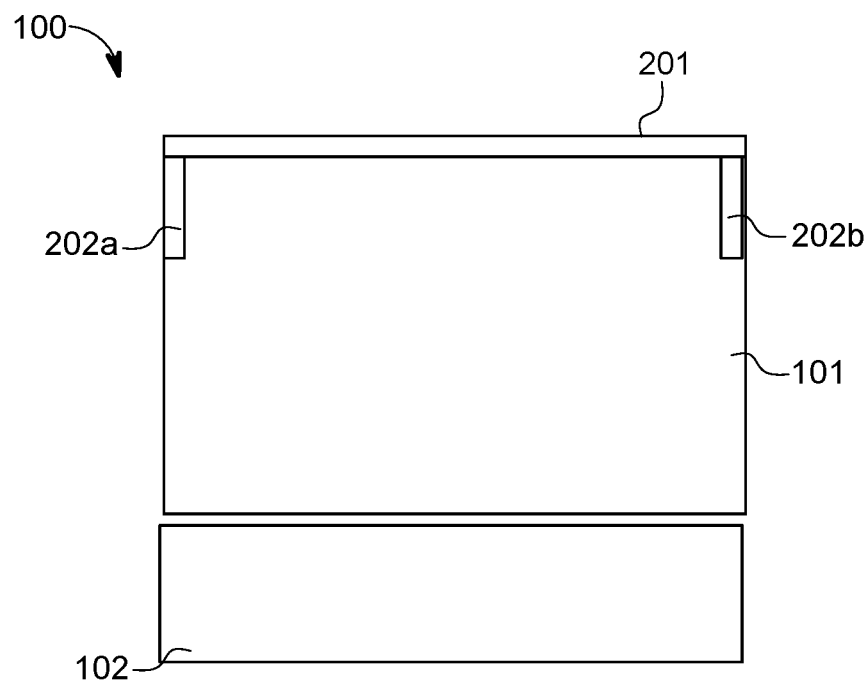
FIG. 2 illustrates a top view of an article of manufacture for providing a rolling truck bed tray with a folding end for extending over a tailgate presented according to the present invention.

FIG. 2 illustrates a top view of an article of manufacture for providing a rolling truck bed tray with a folding end for extending over a tailgate according to the present invention. A rear rail 201 and a pair of side rails 202*a*-*b* are attached to outer edges of the main tray component 101 on three sides. The folding extension component 102 is shown having a width slightly narrower than the width of the main tray component 101 to permit the folding extension component 102 to be folded over and positioned on top of the main tray component 101 between the pair of side rails 202*a*-*b*.

Both the main tray component 101 and the folding extension component 102 possess casters or similar wheels on their respective lower surfaces when unfolded to permit the pickup bed tray 100 to roll up and down the length of the pickup truck bed. The pickup bed tray 100 may be made of wood, steel, aluminum, or synthetic materials having a thickness sufficient to support a desired weight of a load of items to be placed onto the pickup bed tray 100. In one embodiment, a wooden pickup bed tray 100 is made from 0.75" or thicker wood. For a similar pickup bed tray 100 made from aluminum, the pickup bed tray 100 is made from 0.125 or thicker aluminum.

Figure 3A:
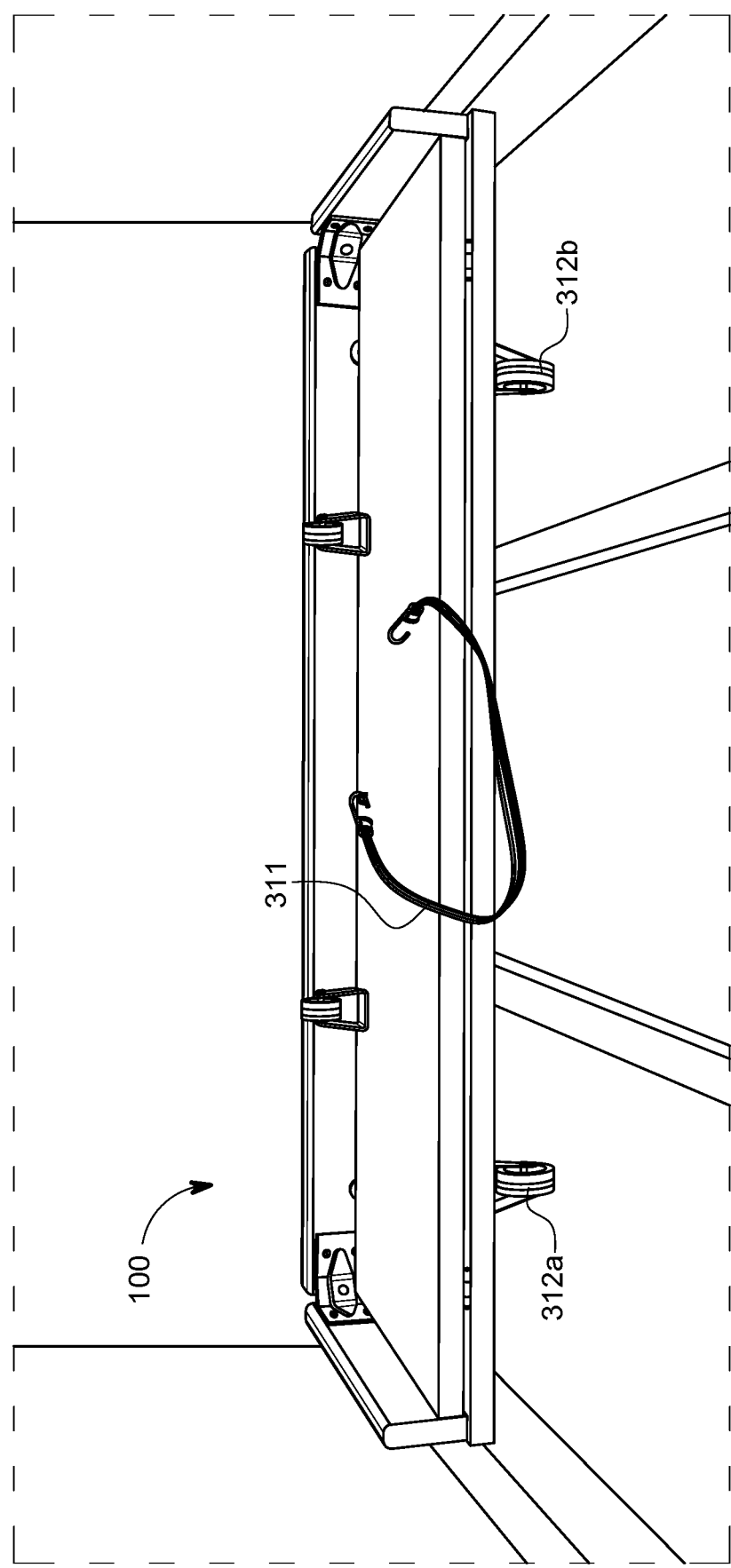
FIGS. 3*a*-*b* illustrate folded and unfolded views of an article of manufacture for providing a rolling truck bed tray with a folding end for extending over a tailgate according to the present invention.
Figure 3B:
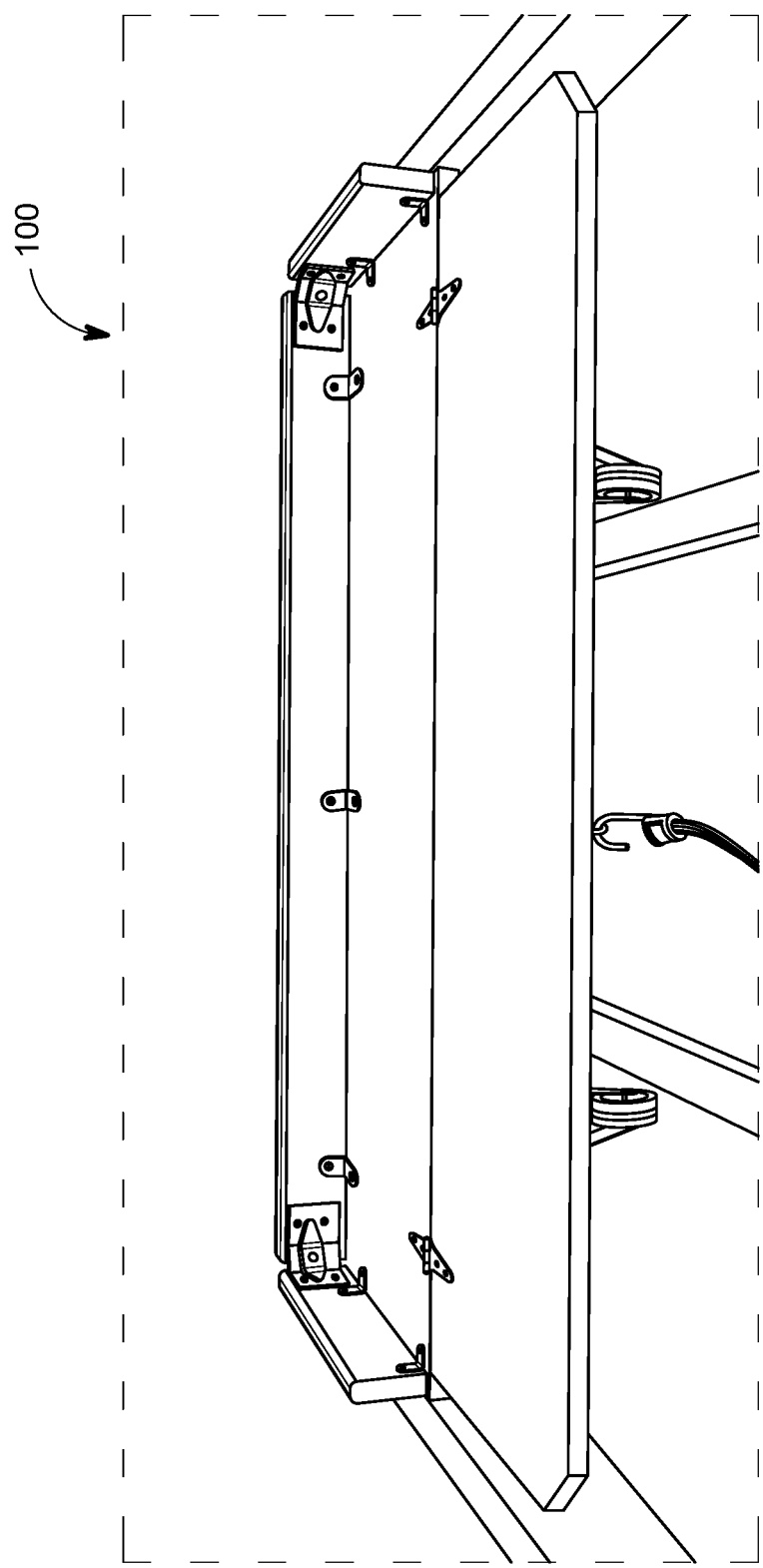

FIGS. 3a-b illustrate folded and unfolded views of an article of manufacture for providing a rolling truck bed tray with a folding end for extending over a tailgate according to the present invention. FIG. 3a shows the pickup bed tray 100 in a closed position. The casters on the underside of the folding extension component 102 are now shown extending upward once the folding extension component 102 has been folded onto the main tray component 101. Front casters are viewable under the main tray component 101 in this view. Additionally, the various embodiments disclosed herein are shown utilizing casters 312a-b on the underside of the pickup bed tray 100 to assist a user in moving the pickup bed tray 100 back into and out of the bed 108 of the pickup truck 105.

FIG. 3b shows a pickup bed tray 100 in an open position in which the folding extension component 102 is fully extended. Casters are shown below the folding extension component 102. Additionally, a folding strap 311 is shown attached to the underside of the folding extension component 102 to assist a user to move the folding extension component 102 from a folded and an extended position. This strap may also include a handle for grasping and lifting the folding extension component 102, a hook to attach a cord, bungie, or similar device, and other mechanisms to assist in pivoting the folding extension component 102 between is two positions. Other devices that assist in the moving of heavy objects may be used in place of the casters 312a-b in any and all of the various embodiments disclosed herein such as the embodiments of FIG. 1-2.

Figure 4A:
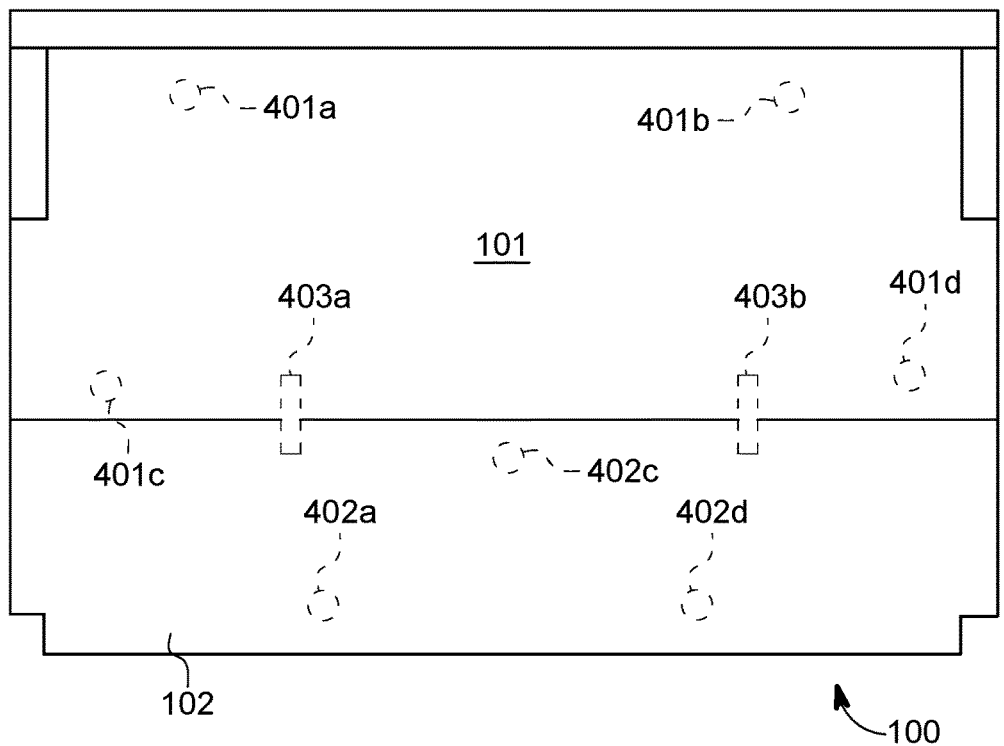
FIGS. 4*a*-*c* illustrate various views of an article of manufacture for providing a rolling truck bed tray with a folding end for extending over a tailgate and its components presented according to the present invention.
Figure 4B:
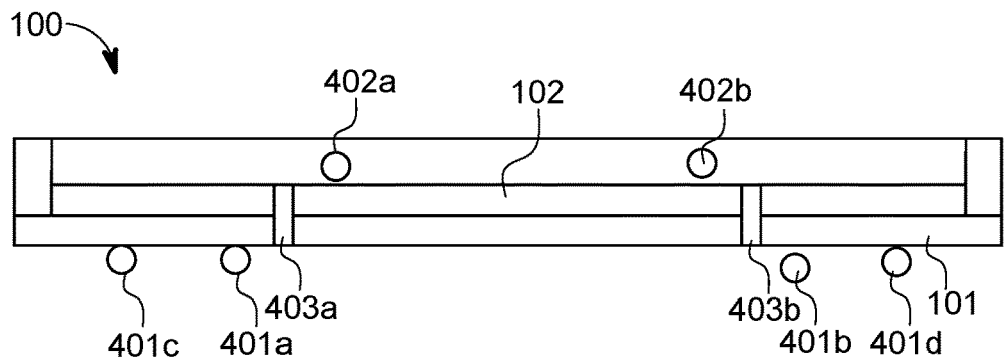
Figure 4C:
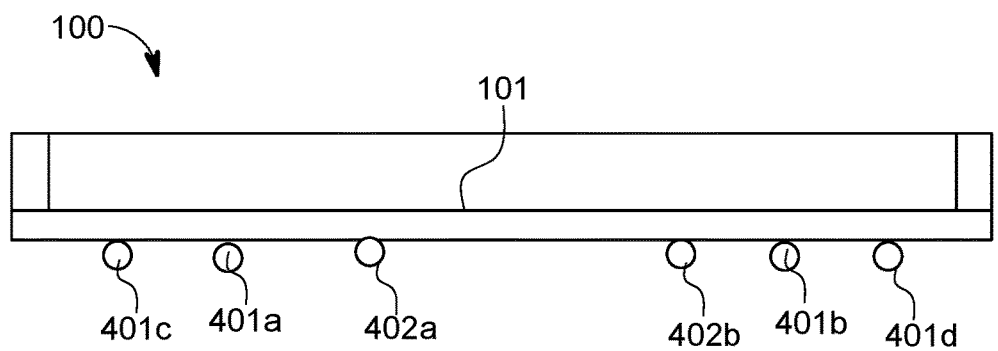

FIGS. 4a-c illustrate various views of an article of manufacture for providing a rolling truck bed tray with a folding end for extending over a tailgate and its components according to the present invention. FIG. 4a shows a top view of a pickup bed tray 100 in which the folding extension component 102 is extended in an open position from the main tray component 101. In this embodiment, the pair of side rails 202a-b run only a partial way down the sides of the main tray component 101. As such, the folding extension component 102 may be the same width at the joint where the main tray component 101 and the folding extension component 102 meet. The outermost edge of the folding extension component 102 may need to be narrowed along its outer edge so that the folding extension component 102 may fold over onto the main tray component 101 and permit a portion of the folding extension component 102 to rest between the pair of side rails 202a-b. The longer the pair of side rails 202a-b are made, the more of the folding extension component 102 must be narrowed.

Locations for a set of casters 401a-d are shown under the main tray component 101 and locations of a pair of casters 402a-b are shown under the folding extension component 102. The number of casters 401 a-d will vary depending on load capacity of the tray. Locations of a pair of hinges 403a-b also are shown connecting the main tray component 101 to the folding extension component 102. The number of hinges 401a-b needed may be determined by the strength of the hinges, the weight of the folding extension component 102 to be folded over onto the main tray component 101, and possibly the weight of a load of items expected to be placed onto the pickup bed tray 100.

FIG. 4b shows a front view of the pickup bed tray 100 having the folding extension component 102 in its closed position. The casters 402a-b from the underside of the folding extension component 102 are shown on top of the pickup bed tray 100. The hinges 403a-b are visible connecting the main tray component 101 and the folding extension component 102.

FIG. 4c shows the pickup bed tray 100 with the folding extension component 102 in an open position. In this orientation, all of the casters 401a-d and 402a-b are on the underside of the pickup bed tray 100. The main tray component 101 and the folding extension component 102 are shown being positioned at the same height above the pickup truck bed to create a single flat surface.

Figure 5A:
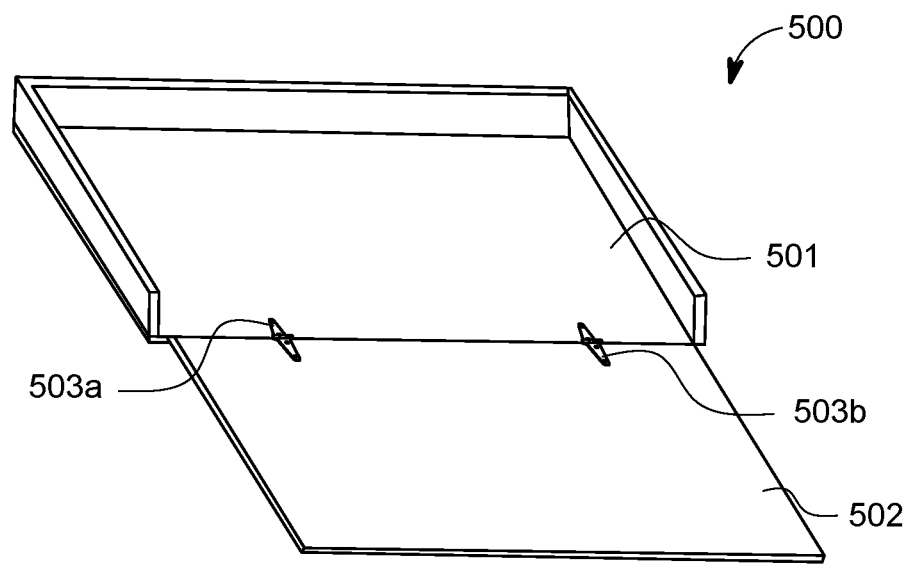
FIG. 5*a*-*b* illustrate another embodiment for a second article of manufacture for providing a rolling truck bed tray with a folding end for extending over a tailgate according to the present invention.
Figure 5B:
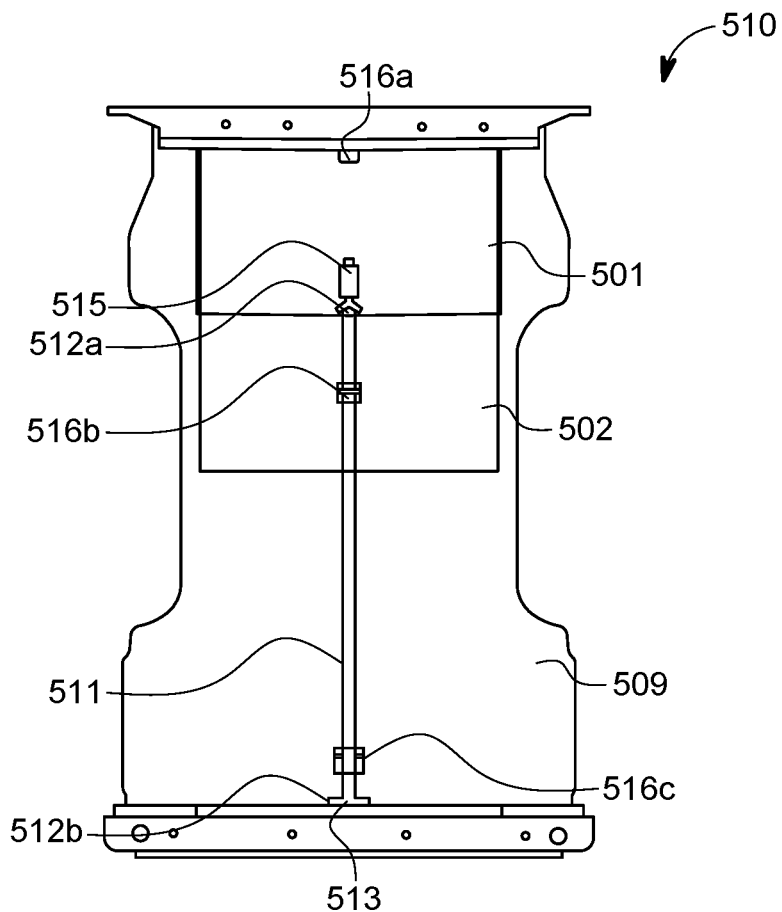

FIG. 5a-b illustrate another embodiment for a second article of manufacture for providing a rolling truck bed tray with a folding end for extending over a tailgate according to the present invention. FIG. 5a shows a rolling bed tray 500 comprising a front leaf 501, a back leaf 502, and a pair of hinges 503a-b coupling the front leaf 501 and the back leaf 502 together. As disclosed above, the rolling bed tray 500 may be made from waterproof wood, heavy duty aluminum, steel and plastic molded injection formed material. The tray may have holes and slots cut out as attachment points to secure loads and the tray itself in the truck bed. The rolling bed tray 500 may include a number of accessories (not shown) that may be attached to the front leaf 501, for example, a toolbox, magnetic traps, and one or more bike fork mounts. These accessories may be integral to the rolling bed tray 500 or may be detachable items that mechanically couple to the front leaf 501 and/or the back leaf 502.

The rolling bed tray 500 also may include a retention system 510 as shown in FIG. 5b. The retention system 510 may include a retention rod 511 that holds the rolling bed tray 500 in place within the truck 105. The retention rod 511 has a latch end 512a and a tailgate end 512b that is coupled to the rolling bed tray 500 by a compression latch 515 using the latch end 512a end of the retention rod 511. The retention rod 511 extends to place the tailgate end 512b against the truck tailgate 109 while the rolling bed tray 500 is pushed up against a front end 513 of the truck bed 509.

A front retention support block 516a coupled a back end of the front leaf 501 to the truck bed 509. A slide support block 516b coupled to the back leaf 502 to support the retention rod 511 under the back leaf 502 when in place. A stop support block 516c supports retention rod 511 about the truck tailgate 109. The set of support blocks 516a-c may be attached to the truck bed 509 using high-strength and waterproof adhesive in a preferred embodiment. The set of support blocks 516a-c may be mechanically coupled to the truck bed 509 using screws if addition retention strength is needed when heavier loads are placed onto the rolling bed tray 500.

Figure 6A:
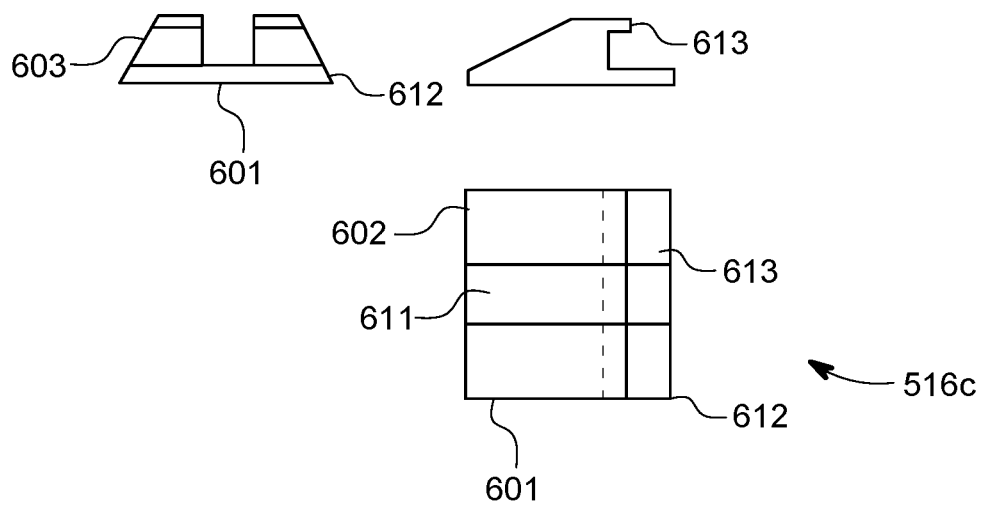
FIG. 6*a*-*e* illustrates components used in the second embodiment or an article of manufacture for providing a rolling truck bed tray with a folding end for extending over a tailgate according to the present invention.

FIG. 6a-e illustrates components used in the second embodiment or an article of manufacture for providing a rolling truck bed tray with a folding end for extending over a tailgate according to the present invention. FIG. 6a illustrates a top view, a side view, and a front view of a stop support block 516c according to the present invention. The stop support block 516c has a dimension of 1.5" long 601 by 1.5" wide 602 and 0.5" tall 603 in a preferred embodiment. A 0.4" wide slot 611 runs the entire length of the stop support block 516c and is centered within the width 602. The 0.4" wide slot 611 has a depth of 0.4" that provides a 0.1" base 612 in which the retention rod 511 may rest.

A c-shaped slot 613 runs the entire width 602 of the stop support block 516c and is located along one end of the length 601. The c-shaped slot 613 has a 0.1" base 614 that is integral to the base of the 0.4" wide slot 611 that is running perpendicular to the c-shaped slot 613. The c-shaped slot 613 has a 0.08" top edge 614 that extends 0.2" over the top of the c-shaped slot 613 about its deepest point. The c-shaped slot 613 has a height of 0.320". The retention rod 511 is placed within the 0.4" wide slot 611 with the tailgate end 512*b* positions against the truck tailgate 109. The stop support block 516*c* is placed within the truck bed 509 with the c-shaped slot 613 closest to the truck tailgate 109.

Figure 6B:
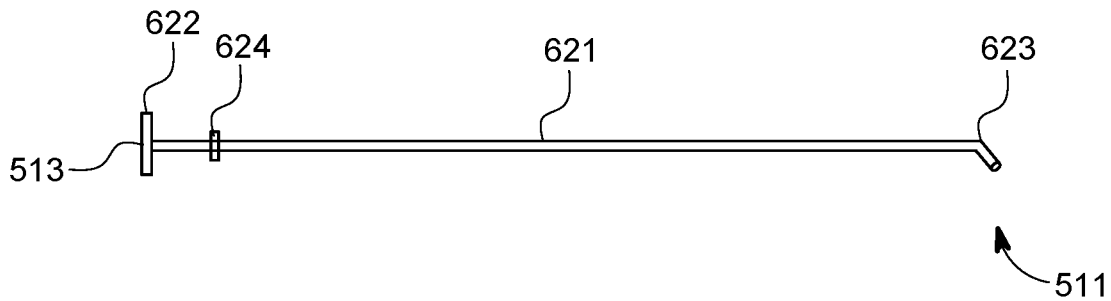

FIG. 6*b* illustrates a side view of a retention rod 511 according to the present invention. The retention rod 511 comprises a ¾" diameter rod member 621 having a handle 622 at the tailgate end 512*b*, a stop coupler 624 about the tailgate end 512*b* to engage the stop block 612*c*, and a bent hook 623 at the latch end 512*a*. The handle 622 is perpendicular to the rod member 621 having a support face 625 that is placed against the truck tailgate 109. The rod member 621 is located in a center of the handle 622 is a preferred embodiment.

The bent hook 623 adds a 70° downward bend in the rod member 621 that is inserted into the compression latch 515. The bent hook 623 imposes downward pressure onto the compression latch 515 when the retention rod 511 is inserted. The retention rod 511 slides into the slide block 516*b* on it path to the compression latch 515. The retention rod is placed into the 0.4" wide slot 611 within the stop block 612*c* allowing the stop coupler 624 to engage the c-shaped slot 613 to hold the retention rod 511 in place. The stop coupler 624 extended perpendicular to the rod member 621 having a shape sized to match the c-shaped slot 613.

Figure 6C:
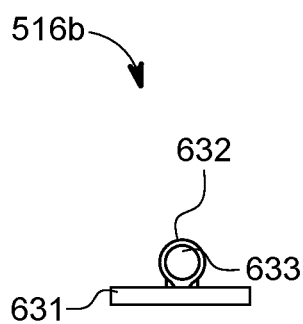

FIG. 6*c* illustrates a slide block 612*b* according to the present invention. The slide block 612*b* comprises a base element 631 and a securing ring 632 coupled to a top surface of the base element 631 perpendicular to the path of the retention rod 511. The securing ring 632 has a through hole 633 centered within is face having a diameter of ?" to permit the retention rod 511 to pass within.

Figure 6D:
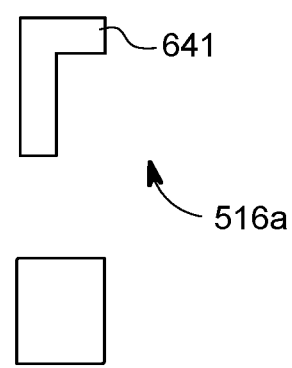

FIG. 6*d* illustrates a top view and a side view of a retention support block 516*a* according to the present invention. The retention support block 516*a* is an inverted L-shaped block 641 having dimensions of 1" by 1". A top portion of the retention support block 516*a* engages 0.25" on the rolling bed tray 500 to hold the tray in place.

Figure 6E:
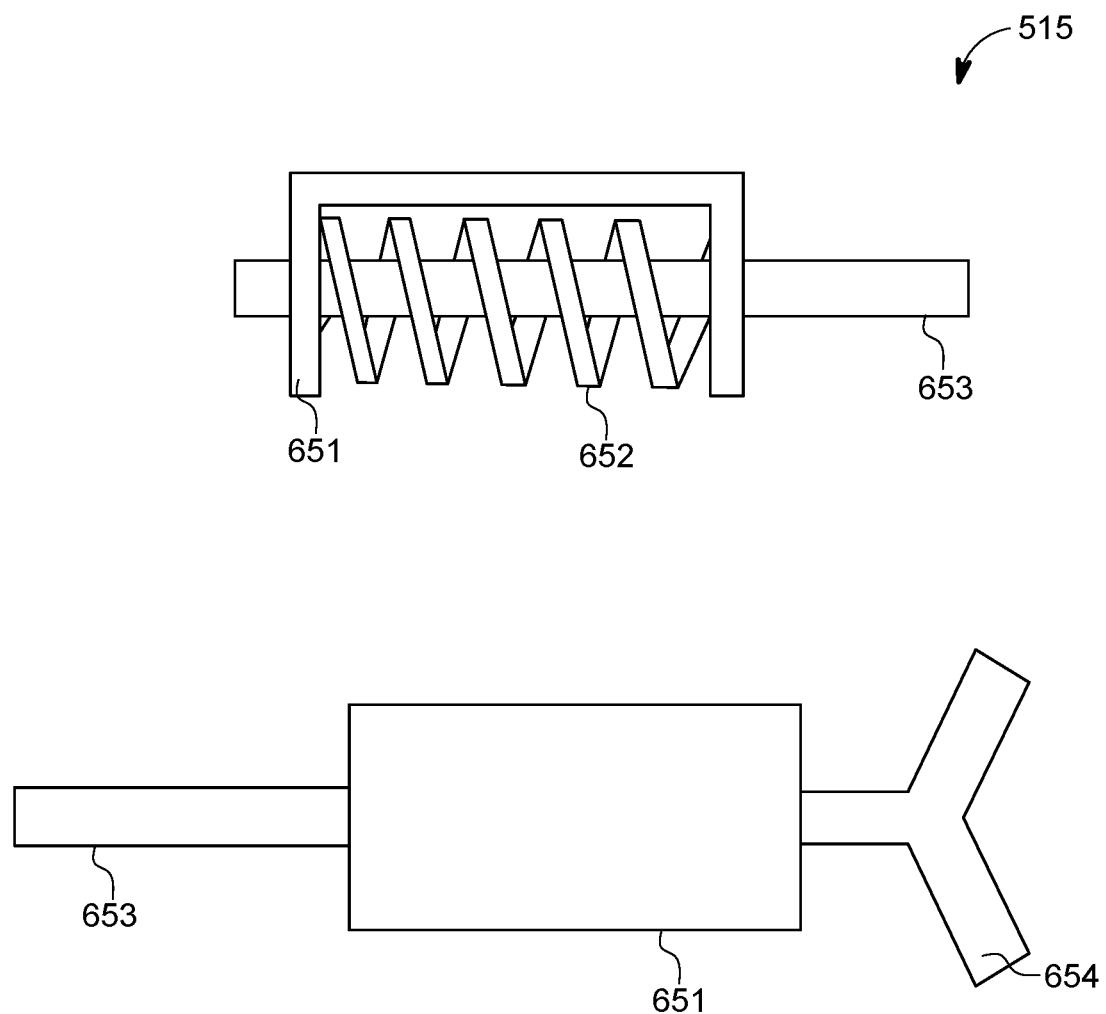

FIG. 6*e* illustrates a top view and a side view of a compression latch 515 according to the present invention. The compression latch 515 comprises a housing 651, a spring 652 coupled to a latching rod 653. The latching rod 653 has a Y-shaped end 654 to engage the bent hook 623 when the retention rod 511 is inserted. With the retention rod 511 in place, the latching rod 653 compresses the spring 652 as the bent hook 623 engages the Y-shaped end 654 to exert a retaining force along the length the retention rod 511 as its support face 625 of the handle 622 presses against the truck tailgate 109.

In another embodiment, the retention system may comprise a set of straps for securing the rolling truck bed tray in place. The straps may connect hardware components such as eye hooks to various tie-down points within the truck bed 509. These straps may include bungy cords having hooked ends, fabric straps having a ratcheting connection device, and ropes tying the rolling bed tray to the truck bed 509.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. An article of manufacture for providing a rolling truck bed tray having a folding end, the rolling truck bed tray comprises:
a main tray component having a width that fits within a bed of a pickup truck; and
a folding extension component coupled to the main tray component by one or more hinges, the folding extension component having an open position in which the main tray component and folding extension component are oriented at a common height above the bed of the pickup truck and a closed position in which folding extension component is oriented on top of the main tray component; and
a retention system for securely holding the rolling truck bed tray in place, the retention system comprises:
a retention rod;
a compression latch coupled to the rolling truck bed tray; and
a set of support blocks coupling the retention rod in a particular orientation.

2. The rolling truck bed tray according to claim 1, wherein a combined length of the main tray component and the folding extension component in the open position is less than the length of the bed of the pickup truck with a tailgate in a closed orientation.

3. The rolling truck bed tray according to claim 1, wherein a plurality of casters are coupled to an underside of the main tray component.

4. The rolling truck bed tray according to claim 3, wherein multiple casters are coupled to the underside of the folding extension component.

5. The rolling truck bed tray according to claim 1, wherein the main tray component comprises a rear rail coupled to an upper side along a back edge and a pair of side rails coupled to the upper side alongside edges.

6. The rolling truck bed tray according to claim 5, wherein the pair of side rails run an entire length of the main tray component.

7. The rolling truck bed tray according to claim 6, wherein the folding extension component is narrower than the main tray component to fit between the pair of side rails when in its closed position.

8. The rolling truck bed tray according to claim 1, wherein the main tray component and the folding extension component are made of aluminum.

9. The rolling truck bed tray according to claim 1, wherein the main tray component and the folding extension component are made of steel.

10. The rolling truck bed tray according to claim 1, wherein the main tray component and the folding extension component are made of a material comprising wood.

11. The rolling truck bed tray according to claim 1, wherein the the main tray component and the folding extension component are made of synthetic materials.

12. The rolling truck bed tray according to claim 1, wherein the retention system comprises a set of straps for securing the rolling truck bed tray in place, either in front or back of the bed.

13. The rolling truck bed tray according to claim 1, wherein the set of support blocks comprise
a retention support block;
a slide support block coupled to the rolling truck bed tray; and
a stop block.

14. The rolling truck bed tray according to claim 1, wherein the retention rod comprises:
- a rod member having a tailgate end and a latch end;
- a handle at the tailgate end;
- a stop coupler about the tailgate end to engage the stop block; and
- a bent hook at the latch end for coupling with the compression latch.

15. The rolling truck bed tray according to claim 14, wherein the compression latch comprises:
- a housing;
- a spring; and
- a latching rod, having a Y-shaped end, coupled to the spring.

16. The rolling truck bed tray according to claim 15, wherein the bent hook of the retention rod engages the Y-shaped end of the latch rod to compress the spring generating a retaining force along the length of the retention rod to cause a support surface of the handle to secure the retention system in place.

* * * * *